March 12, 1963 R. F. SHANNON ET AL 3,081,269
FOAMABLE COMPOSITION COMPRISING A NOVOLAC RESIN, A
MONOALKYL-TRI(POLYALKOXYDIALKYLSILOXY)-SILANE, A
CURING AGENT, AND A BLOWING AGENT, AND
PROCESS OF MAKING SAME
Filed July 24, 1961
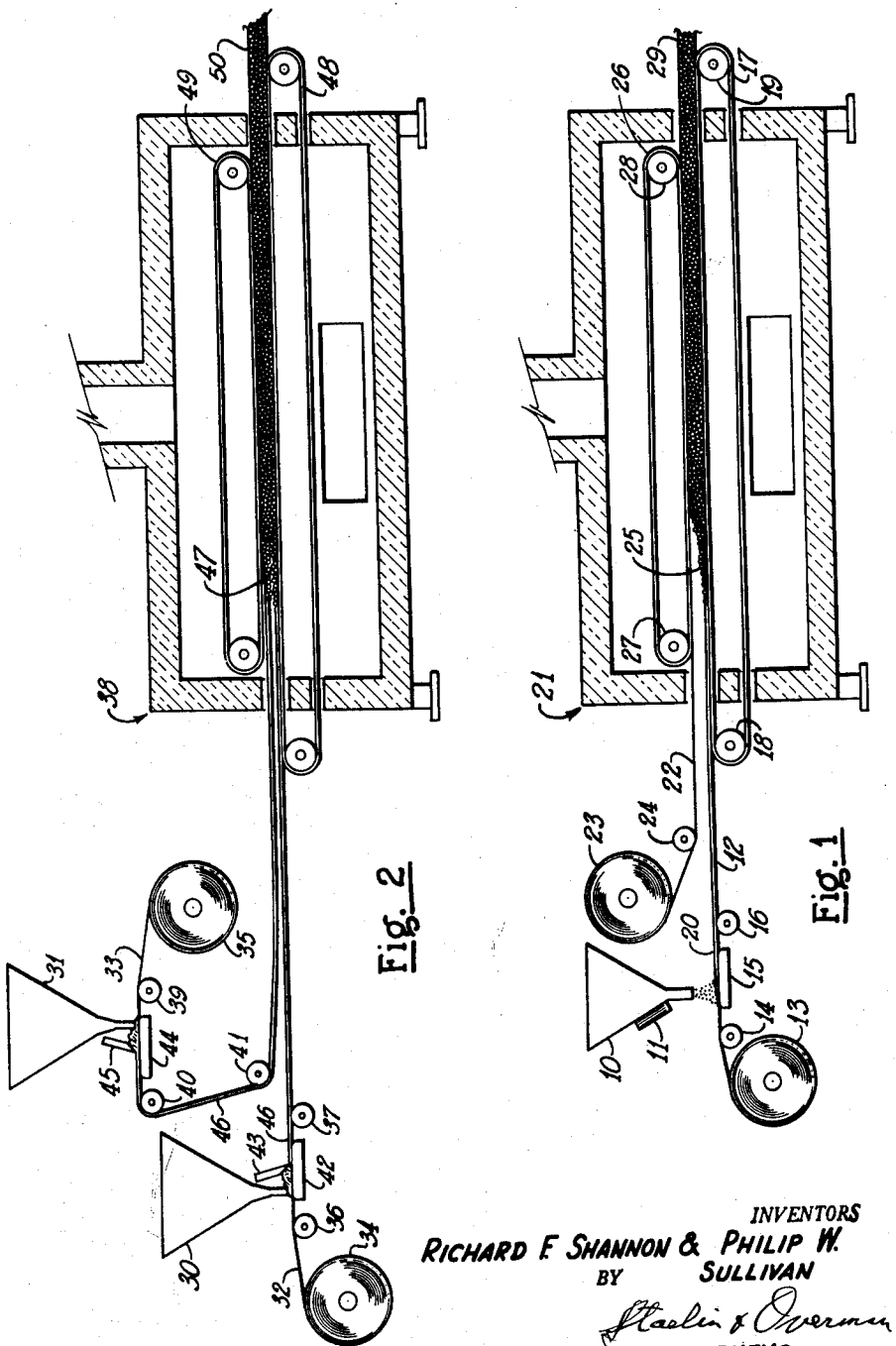
INVENTORS
RICHARD F. SHANNON & PHILIP W. SULLIVAN
BY
ATTORNEYS

United States Patent Office 3,081,269
Patented Mar. 12, 1963

3,081,269
FOAMABLE COMPOSITION COMPRISING A NOVO-
LAC RESIN, A MONOALKYL-TRI(POLYALKOXY-
DIALKYLSILOXY)-SILANE, A CURING AGENT,
AND A BLOWING AGENT, AND PROCESS OF
MAKING SAME
Richard F. Shannon, Lancaster, and Philip W. Sullivan,
Newark, Ohio, assignors to Owens-Corning Fiberglas
Corporation, a corporation of Delaware
Filed July 24, 1961, Ser. No. 126,184
16 Claims. (Cl. 260—2.5)

This invention relates to phenolic novolac compositions, and to articles produced therefrom, and more particularly, to thermosettable phenolic novolac compositions containing a monoalkyl-tri(polyalkoxydialkylsiloxy)-silane and to cellular articles produced from such a composition.

Various foamable resinous materials, as well as numerous articles produced therefrom, have heretofore been suggested. Foamable phenolic resins and articles produced therefrom would appear to be economically advantageous because of the comparatively low cost of the phenolic resins. Relatively friable foams have been produced from phenolic resoles, but, so far as is known, the production of a foam from a phenolic novolac has not heretofore been suggested, and no significant commercial use has been found for foams produced from resoles. A major problem with foams produced from resoles is the corrosive nature thereof. The final cure of a resole from a water-soluble or water-dispersible condition to a thermoset condition is carried out under strongly acid conditions. The acid is not eliminated during the final cure, but remains associated with the cured material and makes it highly corrosive. Furthermore, water, which is produced as a chemical by-product of the final condensation of a resole, as well as water which is usually associated with a resole as a solvent or dispersing medium, is extremely difficult to separate from the thermoset product which results when polymerization is complete, and particularly so when that product is in a foamed condition.

The present invention is based upon the discovery of a foamable novolac composition, and of various articles produced therefrom. A composition according to the invention is neither acidic nor alkaline, can be essentially anhydrous, and can be foamed and condensed to a thermoset condition without the evolution of water. A simple article which can be produced readily from a composition according to the invention is entirely suited for use as a low temperature thermal insulating material, for example.

It is, therefore, an object of the invention to provide a foamable composition comprising a novolac.

It is a further object of the invention to provide various articles produced from a foamable composition comprising a novolac.

Other objects and advantages will be apparent from the description which follows, reference being made to the accompanying drawings, in which:

FIGURE 1 is a schematic showing of apparatus in which a foamable composition comprising a novolac can be used in the manufacture of a simple article suited for use as a low temperature thermal insulation; and FIGURE 2 is a similar showing of a modified apparatus in which such an article can be produced.

A foamable composition is provided according to the invention. Such foamable composition comprises about 80 parts of a novolac resin, a quantity of a curing agent which is reactive with the novolac resin, by connecting molecules thereof through methylene groups, and sufficient in amount to convert, at an elevated temperature, the novolac to a thermoset condition, and from about 0.2 part to about 10 parts of a monoalkyl-tri(polyalkoxydialkylsiloxy)silane, having the generic formula $RSiZ_3$. In this formula R is an alkyl radical containing from 1 to 3 carbon atoms (i.e. methyl, ethyl, propyl or isopropyl) and Z is a polyalkoxydialkylsiloxy radical. Preferably, Z has the formula

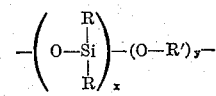

wherein R is an alkyl radical having from 1 to 3 carbon atoms, R' is an alkylene radical containing from 1 to 4 carbon atoms, and x and y each are whole number integers other than zero and one. Preferably, x is from 3 to 8, and most desirably from 6 to 8. Preferably y is from 8 to about 50, and most desirably 20 to 40. Within each silane molecule the "Z" radicals may all be the same, or each may differ from the others. Within each "Z" radical the dialkylsiloxy and alkoxy units may all be the same or they may differ, so long as the R and R' requirements as already set forth are observed. It will be appreciated that the "Z" foregoing formula is incomplete, as it is represented by a bifunctional radical, while in actual practice it generally is end stopped by a suitable monofunctional radical. In like manner, the monofunctional radical, functioning as the end stopper, may be the same or may differ in the various "Z" radicals of the silane structure. The silane molecule contains three "Z" radicals and preferably a total of from about 12 to 24 dialkylsiloxy units,

and from about 60 to 100 alkylenoxy units, —OR'—, per silane molecule.

While the preferred silane employed is of a structure containing three lower alkoxy end-stopped polyalkoxydialkylsiloxy radicals, there may be present a small amount of the silane in which two or more polyalkoxydialkylsiloxy radicals are not end stopped but instead connect to each other to form a cyclic structure. A silane containing a large amount of cyclic structure should be avoided as such silanes tend to be gels or rubbery solids not easily admixed with the phenolic novolac.

As already mentioned, the "Z" foregoing formula is incomplete, in that it is represented as a bifunctional radical while in practice, generally it is end-stopped, by a monofunctional radical. Preferably it is lower alkoxy end-stopped, so that it has the following formula

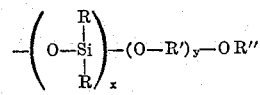

wherein R and R' have the meanings set forth above, and OR" is an alkoxy radical containing from 1 to 5 carbon atoms, and preferably 4 carbon atoms. "Z" can also be end-stopped in any of several other ways, for example by a monofunctional siloxy radical as —O—SiR₃, by a difunctional siloxy radical, as the alkoxysiloxy radical of

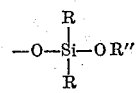

by an oxyglycol radical, as O—R'OH, or by like radicals. In these instances the "Z" radicals are end-stopped in such manners as represented by the following generic formulas:

Monofunctional silane end-stopped

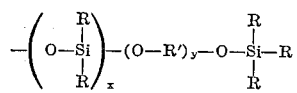

Alkoxysilane end-stopped

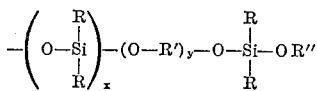

Glycol end-stopped

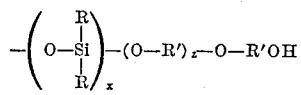

In the foregoing formulas R and R' and OR" have the meanings previously set forth.

An essential feature of the silane employed, whether the silane contains some cyclic structure or is end-stopped by the preferred lower alkoxy radical or in another manner, is that in the $RSiZ_3$ structure each of the "Z" radicals consists essentially of repeating units

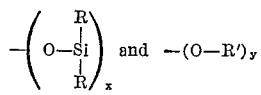

wherein R and R' and $x$ and $y$ have the meanings previously set forth.

In general the monoalkyl-tri(polyalkoxydialkylsiloxy)-silanes may be produced by heating a monoalkyl-tri(polydialkylsiloxy) silane, such as an ethyl-tri(polydimethylsiloxy) silane containing on the average a total of about 20 dimethylsiloxy units per molecule, with a liquid glycol or polyglycol and an end-stopper. The siloxy radicals of these silanes should have at least one terminal alkoxy group. Such monoalkyl-tri(polydialkylsiloxy)-silanes and liquid glycols or polyglycols are available commercially and also can be produced in manners well known in the art. The reaction mixture is heated, whereupon ester-exchange occurs between the glycol or polyglycol and the silane, and the repeating units represented above are formed, as well as an alcohol by-product from the alkoxy radicals of the silane. Frequently an acid or base catalyst is employed. The heating is preferably to a temperature sufficiently high that the alcohol by-product is vaporized, but low enough that the starting materials and product remain in the liquid phase. Such reactions are disclosed generally in U.S. Patent 2,386,793 and German Patent No. 940,855. When the identity of the end-stoppers is unimportant, the glycol and the silane are reacted in substantially the desired molar proportions, and reaction continued until a desired chain length is achieved. When a monofunctional silane is used as an end-stopper, the glycol and the silane should be reacted in substantially the desired molar proportions, and three mols of the monofunctional silane for each mol of the monoalkyl-silane starting material added slowly to complete the chain stopping after the desired chain length is achieved. With some acidic end-stopping agents, the agent in a suitable amount may be admixed with the silane and the glycols or polyglycols prior to warming. In other preparations an alkylene oxide is reacted in place of the glycols or polyglycols with monoalkyl-tri(polysiloxy)-silane starting materials containing an active hydrogen on the siloxy terminal groups to provide the useful silane product employed in the invention.

Ester exchange occurs to form the repeating units, represented and discussed above, when an anhydrous reaction mixture consisting essentially of the ethyl-tri(polydimethylsiloxy)-silane, a glycol, and an end-stopper, if desired, is heated. Any moisture in the reaction mixture, however, tends to hydrolize the alkoxy silane or alkoxysilanes therein to the corresponding silanol or silanols and, if the effect of mass action is ignored,

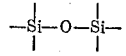

condensation will occur preferentially. It will be appreciated that it is virtually impossible to achieve anhydrous reaction conditions, especially in view of the hydrophylic nature of silanes employed. Statistically therefore, it is to be expected that the resulting silane includes some higher molecular weight products containing additional

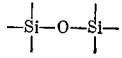

linkages and some cyclic structures even when anhydrous conditions are attempted. Desirably the copolymers are produced by essentially anhydrous copolymerization.

In view of the foregoing detailed discussion, it will be apparent that the useful silanes can be defined generically as consisting essentially of a monoalkyl siloxane group (a trifunctional group, sometimes called a "T" unit) and the aforediscussed repeating dialkylsiloxy units and alkoxy units. The identity of the chain-stopping group on the silane is relatively unimportant, so long as the silanes are sufficiently stable to enable convenient handling prior to incorporation in the novolac composition. Preferably, the average molecular weight of the useful silanes is from about 2100 to about 10,000, and most desirably from about 5000 to 7400. The ratio of dialkylsiloxy units to alkoxy units in the structure also is relatively unimportant so long as the ratio of the two provides a form, preferably liquid, of the silane which can be readily incorporated in the novolac composition. The useful silanes can also be defined as having a molecular structure which includes the groups

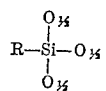

and

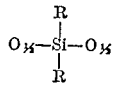

and

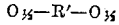

preferably in molar proportions of from 1:12:60 to 1:24:100, and desirably in molar proportions of about 1:20:80, where R and R' have the meanings previously set forth.

Suitable monoalkyl-tri(polyalkoxydialkylsiloxy) silanes are available commercially. For example, L-520 Silicone, sold by Union Carbide and Carbon Corporation, is of the following approximate structure:

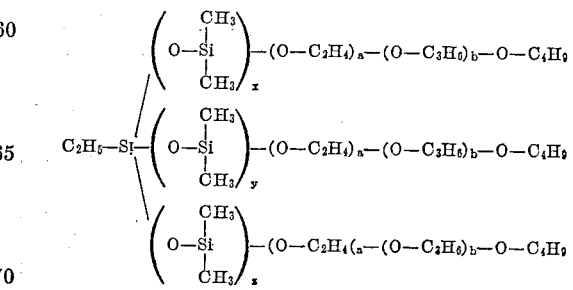

In this structure $x+y+z$ totals approximately 20, the silicone portion is about 25 percent by weight and the polyol about 75 percent by weight. The polyol portion is butoxy chainstopped on one end and is essentially Ucon HB-660 (Union Carbide and Carbon Corporation), which has the following properties:

Viscosity index (ASTM
  D-567-53) _____ 144.
Viscosity, Saybolt seconds at:
  210° F _____ 125.
  100° F _____ 660.
  0° F _____ 30,700.
Refractive index _____ 1.459.
Pour point, ° F _____ −30.
Vapor pressure _____ 0.01 mm. Hg at 68° F.
Flash point (open cup) _____ 440° F.
Fire point (open cup) _____ 545° F.

Another commercially available suitable silane is SF-1934 Silicone, sold by the General Electric Company. This material has essentially the same structure as L-520 Silicone. Each of these materials generally contains a minor amount of a stabilizer additive.

A preferred foamable composition according to the invention also includes, with 80 parts of the novolac, from about ½ part to about 10 parts of a blowing agent which is effective, at the temperatures encountered during a desired curing reaction between the novolac and the curing agent, to generate a gas within the composition before cure is effected. When a blowing agent is used which includes both active and inert constituents, from 1 part to 10 parts of active constituents should be employed. Novolacs and foamable compositions comprising novolacs are hygroscopic in nature and tend to pick up moisture upon standing. It has been found that such moisture to the extent of from about ⅟₁₂ part to about 2½ parts, per 80 parts of the novolac, is advantageous and acts as a blowing agent.

The terms "percent" and "parts" are used herein, and in the appended claims, to refer to percent and parts by weight, unless otherwise indicated.

The identity of the novolac resin which is one of the constituents of a foamable composition according to the invention is relatively unimportant, so long as the novolac is one which is curable to a thermoset condition, and can be incorporated in a foamable composition by a desired technique as subsequently discussed in more detail. It is necessary, therefore, that the novolac be produced from reactants which include at least some of a tri-functional phenol. The most common suitable novolac resins are acid condensed, fusible, products of reaction of formaldehyde and phenol in ratios of from about ½ mol to about 1 mol of the former per mol of the latter, and corresponding products where furfural or acrolein have been substituted for at least a part of the formaldehyde. A novolac is essentially insoluble in water, but soluble in some organic solvents, e.g., in alcohols. A foamable composition according to the invention is, therefore, essentially anhydrous, but can be either a solid or a solution or dispersion in an organic solvent. A detailed discussion of novolacs can be found in The Chemistry of Phenolic Resins, Robert W. Martin, John Wiley & Sons, Inc., New York, New York, 1956 (see, in particular, pages 99–112, and cited references).

As has been indicated above, a foamable composition according to the invention also includes a curing agent for the novolac. Hexamethylenetetramine and paraformaldehyde are suitable curing agents which are frequently used with novolacs. However, any other known suitable curing agent, for example a resole, a thermosettable urea formaldehyde material, or the like, can also be employed. Excellent results have been achieved using from about 5 parts to about 20 parts of hexamethylenetetramine with 80 parts of the novolac. An equivalent proportion of paraformaldehyde or other suitable curing agent can be substituted for the hexamethylenetetramine, but optimum foamed products are produced when the blowing agent employed is one which, like hexamethylenetetramine, does not form water of condensation when it reacts with a novolac. Paraformaldehyde produces water of condensation during the course of reaction with a novolac, and, therefore, is a less desirable curing agent than hexamethylenetetramine.

Both water of condensation, which is produced by paraformaldehyde, and nitrogenous gases of condensation, principally nitrogen and ammonia, as formed by hexamethylenetetramine, constitute blowing agents which are effective to cause expansion into a cellular structure of a composition according to the invention. However, as is indicated above, an additional blowing agent is preferably also employed in such a composition. It has been found that the blowing action of a curing agent is usually insufficient in extent to enable the production of low density foams, for example, foams having apparent densities less than about 5 pounds per cubic foot. Since the cost of the novolac which is foamed is a significant part of the total cost of a foamed product according to the invention, it is economically advantageous to produce low density foams, and, therefore, such a foamable composition preferably includes a sufficient amount of a blowing agent to supplement the blowing action of the curing agent and enable the production of a low density foam.

To be effective to supplement the action of hexamethylenetetramine or other curing agent in producing a low density foam according to the invention, a blowing agent must be one which is comparatively stable at temperatures below, and often comparatively near, the temperature range within which the novolac cures rapidly, and which vaporizes or decomposes and forms a gaseous decomposition product at the temperatures encountered during a desired curing reaction, but before cure is effected. It will be appreciated that any of many known blowing agents can be used for this purpose, and that the specific identity of the blowing agent is relatively unimportant so long as its vaporization or decomposition occurs at a temperature which is appropriate for the particular novolac being foamed. In most cases, the blowing agent should be one which is effective to release a gas at temperatures within the range of 65° C. to 250° C. Excellent results have been achieved using between about ½ part and about 10 parts of dinitrosopentamethylenetetramine in a foamable composition containing 80 parts of a particular novolac. It will be understood that the cure of a novolac, in the presence of a curing agent, will proceed at an extremely slow rate at some given temperature, and at progressively increasing rates at high temperatures. The curing reaction is, therefore, a time-temperature phenomenon which can be made to proceed to a desired extent at any of a number of temperatures, provided that a proper time interval at the selected temperature is provided. The rate at which cure proceeds at any given temperature depends upon many factors, including the specific identity of the novolac, the amount and identity of the curing agent available for reaction therewith, the pressure to which the composition is subjected, and various other factors. While, as has been indicated above, the specific identity of the blowing agent used is of only minor importance, the agent must be effective in the particular composition with which it is used, and under the blowing and curing conditions employed. For example, any blowing gas generated either before the novolac-containing composition is fused, or after curing to an infusible condition has occurred, is wasted. The curing agent used must be one which releases the desired or required quantity of a blowing gas while the composition is fused under the particular curing conditions employed. Since the release of a blowing gas by a blowing agent is, like the cure of the novolac, a time-temperature phenomenon, the heating cycle used to effect blowing and curing can be varied within substantial limits to adapt the blowing action of a particular agent to the fusing, and curing characteristics of a particular composition. Instead of the ½ part to 10 parts of dinitrosopentamethylenetetramine, various other known blowing agents, within the same range of proportions, can be used in a composition according to the invention, as indicated in the following table:

| Blowing agent: | Effective temperature range, °C. |
|---|---|
| Azobisisobutyronitrile | 105–120 |
| Azo dicarbonamide 1,1-azobisformamide | 100–200 |
| Benzenesulfonyl hydrazide | 95–100 |
| N,N'-dinitroso-N,N'-dimethyl terephthalamide | 65–130 |
| Dinitrosopentamethylene tetramine | 130–190 |
| Ammonium carbonate | 58 |
| p,p'-Oxybis-(benzenesulfonyl hydrazide) | 100–200 |
| Diazoaminobenzene | 84 |
| Uurea-biuret mixture | 90–140 |
| 2,2'-azo-isobutyro-nitrile | 90–140 |
| Azo hexahydrobenzo-nitrile | 90–140 |
| Diisobutylene | 103 |
| 4,4' diphenyl disulfonylazide | 110–130 |

As has previously been stated, a foamable composition according to the invention comprises from about 0.2 part to about 10 parts of the monoalkyl-tri-(polyalkoxydialkylsiloxy)-silane. It has been found that the use of such a silane, and in proportions within the stated range, has a noteworthy effect upon compressive strength of the cured foam which is produced. In addition, the silane has a marked effect upon cell size and the ability of a composition to expand, enabling the production of cured, low density foams composed of a plurality of small and comparatively uniform cells. It is believed that the effect on cell size can be attributed to a surface phenomenon. This belief is supported by the observation that any of several known surface-active agents, for example lauryl sodium sulfate can be substituted for the silane to produce a foamable composition which can be converted to a cured foam having comparatively small and uniform cells, by comparison with cell size achievable if no wetting agent is used. Cured foams achievable with the novolac composition of the invention containing the indicated silane have very small and uniform cells of a size less than 10 mils and usually within the range of 1 to 4 mils. By comparison the cured foams of the novolac composition containing the lauryl sodium sulfate or other effective agents have comparatively non-uniform and larger cells, generally ranging in size from 60 to 250 mils. Although the system is essentially anhydrous, lauryl sodium sulfate is a known surface-active agent, and its effect upon cell size is believed to be attributable to a surface phenomenon, quite possibly a lowering of surface tension. Efforts to measure surface tension, however, have been unsuccessful because of the extremely high viscosity of the novolac-containing foamable compositions, even at elevated temperatures. Reasoning by analogy, the materially greater influence of the silane upon cell size is also attributed to a surface phenomenon. In addition, however, the silane greatly decreases the heat transfer coefficient (K value) and greatly enhances the compressive strength of the cured foam, by comparison with a similar foam wherein lauryl sodium sulfate or other effective surface-active agent is substituted for the copolymer. It is believed that strengthening of the cured foams by the indicated silanes indicates interreaction thereof with the novolac, but the mechanism of such interreaction has not been established.

A foamable composition of the invention, apparently because it contains one of the indicated silanes, and in proportions within the stated range, also provides a noteworthy improvement in the production of articles which comprise a cured novolac foam and a mass of intermeshed fibers. Generally, in the production of such articles, the foamable novolac composition is foamed and cured in such a manner that the foam penetrates into the mass of intermeshed fibers and cures in place within the mass. Foamable novolac compositions of the invention provide vastly superior articles of this type, because penetration of the foam into the mass, and cure therein, is facilitated. This improvement is quite striking by comparison with compositions including sodium lauryl sulfate or other effective surface active agent in place of the silane, and even by comparison with compositions containing silicones as disclosed in a copending application, Serial No. 746,512, now U.S. Patent No. 2,993,871.

Various materials other than a novolac, a curing agent therefor, a blowing agent and one of the indicated silanes can be incorporated in a foamable composition according to the invention. For example, ammonium formate, ammonium benzoate, ammonium lactate, ammonium molybdate, ammonium borate, ammonium carbonate and ammonium acetate have all been used to facilitate blowing, to control cell size, to mask a comparatively unpleasant odor which is attributed to decomposition of hexamethylenetetramine, when used as a curing agent, or for other similar purposes. Ammonium salts of acids weaker than acetic acid are preferred for this purpose over such salts of acetic or stronger acids because of their less corrosive nature. Other materials can be used similarly to mask such odor, or for other specific purposes, as will be apparent to one skilled in the art.

In producing a foamable composition according to the invention, thorough mixing to achieve uniformity is important. Since the novolac, at room temperature, is usually a fusible solid from which a solution of dispersion can be formed with a suitable organic solvent, hot mixing of a molten novolac at room or other temperature mixing of a novolac solution or dispersion with other required constituents to produce a foamable composition according to the invention, is a suitable method. However, a fused novolac has an extremely high viscosity at all temperatures sufficiently low that curing thereof does not proceed at a comparatively high rate, and it is preferable to avoid any substantial amount of a solvent or dispersing medium when an unreinforced foam is to be produced. It has been found that a novolac can be fused, mixed, while fused, with all other required constituents which are neither affected by the temperature of the fused novolac nor reactive therewith to a significant extent at such temperature during the time required for mixing, to form a uniform dispersion of such constituents in the novolac. The uniform dispersion can then be cooled to solidify the novolac, and the resulting solid mixture crushed or otherwise comminuted to a particle size of about 100 mesh, U.S. Sieve Series, or finer. Hexamethylenetetramine or other curing agent for the novolac, and any other temperature sensitive constituent of the foamable composition, in a similarly comminuted condition, can then be dry blended with the powdered solid suspension, for example by tumbling, to produce the desired foamable composition. The hexamethylenetetramine or other curing agent and any other temperature sensitive constituent of the foamable composition can also be mixed with the fused composition, provided that thorough mixing is accomplished rapidly and the resulting mixture cooled before significant reaction or decomposition occurs. The complete hot mix can be knife-coated, roller-coated, or otherwise applied to a suitable carrier sheet while in a fused condition, and cooled, or can be cooled and comminuted preferably to about 40 mesh or finer, U.S. Sieve Series.

A foamable, novolac containing composition according to the invention can be converted to an expanded, cellular, cured condition from a thin solid film, usually on a suitable carrier sheet such as kraft, glassine-, glass fiber-, glass flake-, or other suitable paper, cellophane, polyester film, polyethylene film, saran film, glass fiber mat, glass fiber fabric, or the like. Such conversions can also be accomplished from a powder of the foamable composition on such a carrier, or in a suitable mold, or admixed with fibers. Suitable fibers have sufficient heat resistance to withstand the temperature for foaming and curing the novolac composition, and include both natural and synthetic, organic and inorganic fibers, such as glass textile fibers, glass wool, excelsior, asbestos fibers, cotton fibers, wool fibers, nylon fibers, and the like. In addition, at least when a foam reinforced with glass or other suitable fibers is to be produced, a solution or dispersion, in a suitable organic solvent, of the foamable composition can similarly be foamed. In any case, the composition must be heated, at least to initiate exothermic reaction between the novolac and the curing agent, and usually also to complete such reaction. Which of the previously discussed methods for producing a foamable composition according to the invention is preferred in a particular instance depends upon the processing technique by which a cellular, cured article is to be produced. For example, when this conversion is to be carried out from a thin film on a suitable carrier, hot mixing of the several ingredients of the composition, and in the absence of any solvent or dispersing medium, is preferred. When the foamable composition is to be processed from a powdered condition, either in a suitable mold or on an appropriate carrier, the powder can be produced in either of the previously discussed ways. When it is desired to introduce a foamable, novolac-containing composition according to the invention into the interior of a mass of intermeshed glass or other similar fibers, it is usually preferred to use a solution or dispersion of the novolac and other constituents of the composition in a suitable organic solvent.

The following example describes the production of a specific novolac, the formulation of a foamable composition containing the novolac, and the conversion of the resulting foamable composition to an expanded, cured condition, in which it constitutes an article useful as a low temperature thermal insulating material.

*Example 1*

A novolac was produced in a jacketed, 10 gallon glass-lined kettle fitted with an anchor-type agitator, a thermometer and a reflux condenser from a charge of 20.29 kilograms of U.S.P. phenol, 12.95 kilograms of 37 percent formalin (a 37 percent solution of formaldehyde in water) and 0.1 kilogram of oxalic acid. The phenol and the formaldehyde were mixed at about 40° C. in the reaction kettle, and the oxalic acid, in a granular condition, was added. The agitator was driven to accomplish this mixing, and was continued until reaction between the phenol and the formaldehyde was substantially complete, and a novolac had been formed. Water at a temperature of about 50° F. was also circulated through the jacket of the reflux condenser from the beginning of the mixing operation until substantial completion of the reaction between the phenol and formaldehyde and production of the novolac. The kettle was then heated by circulating low pressure steam through the jacket to bring the reaction mixture to a temperature ranging from 94° C. to 96° C., and water or steam was then used, as required, to maintain the reaction mixture at a temperature within such range for a period of 6½ hours. Agitation of the reaction products in the kettle was then stopped, and the reaction products were allowed to stand for about 1 hour. During this time a phase separation occurred, an aqueous layer rising to the top, and an organic layer collecting in the bottom of the kettle. The aqueous top layer was then siphoned from the kettle; agitation was resumed; and steam was introduced into the jacket of the kettle to bring the reaction products to a temperature of approximately 120° C. in a period of about 2½ hours. The reaction products were maintained at about 120° C. by suitable adjustment of the flow of steam to the kettle jacket, while gases and vapors were exhausted from the upper portion of the kettle to decrease the pressure therein gradually, over a period of about 15 minutes, until a vacuum of 28″ of mercury was reached, and for an additional hour while a vacuum of about 28″ of mercury was maintained. The vacuum in the kettle was then released, and a 7.7 kilogram portion of the novolac which was contained therein was transferred to a 10 gallon mixing vessel, while the remainder thereof was discharged into shallow pans and allowed to cool to room temperature, at which temperature it was found to be a hard, brittle solid. The novolac was then removed from the pans and broken into relatively large lumps.

The following ingredients were added to the 7.7 kilogram portion of the novolac in the mixing vessel, while the novolac was at a temperature of substantially 110° C.: 200 grams of monoethyl-tri(polyalkoxydimethylsiloxy)-silane,[1] 500 grams of ammonium acetate and 500 grams of diisobutylene. These ingredients were mixed thoroughly by means of a motor driven, propeller-type agitator, and the resulting uniform mixture was then cast into shallow pans and allowed to cool. After the mixture had cooled in the pans, hard, brittle lumps thereof were broken from the pans, crushed, and finally ground in a jar mill. Periodically, the mixture in the jar mill was subjected to a screening operation. Portions of the mixture which passed through a 100 mesh sieve, U.S. Sieve Series, were collected for subsequent use in producing a foamable composition, while portions thereof which remained on the 100 mesh sieve were returnd to the jar, with additional make-up lumps which had not previously been ground, for further comminution. A charge of 89 parts of the minus 100 mesh mixture, 10 parts of minus 100 mesh hexamethylenetetramine and 4 parts of minus 100 mesh dinitrosopentamethylene tetramine was then placed in a drum and intimately mixed by tumbling. The tumbling was accomplished by rotating the drum about its longitudinal axis at a rate of about 40 revolutions per minute for 30 minutes. The resulting admixture was a foamable, curable, novolac-containing composition.

Phenolic bodies in a cellular or expanded condition were then produced from the minus 100 mesh composition by placing five charges thereof ranging from 52 grams to 55 grams on kraft paper sheets positioned in the bottom of an open-topped mold cavity approximately 6″ x 6″ x 2″, placing a second kraft sheet over the open 6″ x 6″ top of the mold cavity, and then pressing a flat platen over the top sheet of kraft paper and the open top of the mold cavity and heating the powder to a temperature of about 360° F. The heating has been accomplished by circulating steam through suitable jacketing of the mold and top platen, and also dielectrically. Each of the charges in the closed mold cavity was maintained at about 360° F. for approximately 30 minutes, and was then removed therefrom in the form of a cured, cellular phenolic body with a kraft paper skin on each of its major surfaces. When dielectric heating is used, a similar result can be accomplished in a matter of seconds. The average apparent density in pounds per cubic foot of the products was about 2.7; the K values averaged ¼ B.t.u. per hour per square foot, per inch of thickness, per degree

---

[1] The monoethyl-tri(polyalkoxydimethylsiloxy)-silane employed had a molecular weight of about 6200 and was of the following formula:

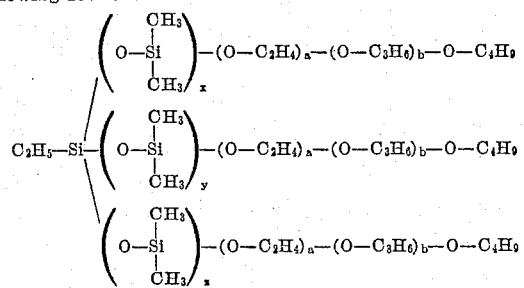

wherein $x$, $y$, and $z$ are whole numbers of about 7 with the sum of $x+y+z$ being about 20, and each $a$ and $b$ is a whole number of about 14, with the number of $C_2H_4$ radicals plus the number of $C_3H_6$ radicals plus the number of $C_4H_9$ radicals being about 90. Such a silane can be purchased commercially.

Fahrenheit; the vapor permeability in perms [1] ranged from 1 to 3; and the average elastic limit [2] was greater than 1000 pounds per square foot, while an average compressive force of about 2360 pounds per square foot was required to cause a 10 percent compression of the foam. The products had very small and uniform cells of a size averaging about 3 to 4 mils with no cells larger than 10 mils being apparent. Various other foams of different apparent densities have also been produced from the foamable composition. The grams of the foamable composition charged to the indicated mold, and the properties of the finished product, are presented in the following table:

| Grams of Foamable Composition Charged | Apparent Density in lbs. per cubic foot | K value, B.t.u. per hour per square foot, per inch of thickness, per °F. | Compressive force, in lbs. per square foot, required to cause a 10% compression | Elastic Limit |
|---|---|---|---|---|
| 31 | 1.6 | 0.26 | 550 | 370 |
| 49 | 2.5 | 0.24 | 950 | 640 |
| 70 | 3.5 | 0.24 | 2,450 | 1,230 |
| 87 | 4.4 | 0.24 | 3,600 | 1,720 |
| 85 | 4.3 | 0.25 | 4,200 | 2,540 |
| 100 | 5.10 | 0.25 | 4,250 | 3,600 |

N.B. In all cases, the cured cellular phenolic products had small uniform cells, ranging from about 3 to 4 mils in size and vapor permeability ranging from 1 to 3 perms.

When, for purposes of comparison, but not in accordance with the invention, the procedure described above was repeated to produce a cured, cellular, phenolic material, except that the same weight of lauryl sodium sulfate was substituted for the silane, the cellular material which was produced had large cells, varying widely in size with cells up to ¼ inch in size being apparent. This cellular material had an apparent density of 5.27 pounds per cubic foot, and had an elastic limit of only 3025 pounds per square foot. A small charge of the foamable composition would not fill the mold, so that a low density material could not be produced. In comparison with cellular products from the compositions containing the silane, products from the compositions containing the lauryl sodium sulfate had higher densities, lacked toughness, were more friable and less flexible, and had higher K values. The novolac composition containing the lauryl sodium sulfate and like compositions containing any of several other surface active agents or various other materials, such as certain aforementioned silicones, were not satisfactory for producing rigid, high strength structures of intermeshed glass fibers and cured novolac foam. In comparison therewith, silane-containing foamable novolac compositions of the invention, such as the composition set forth in Example 1, invariably produced rigid, high-strength structures of intermeshed glass fibers and cured novolac foam.

The apparatus shown in FIG. 1 of the drawings can also be used to produce a phenolic body in a cellular or expanded condition from the minus 100 mesh composition produced as described above. The minus 100 mesh material is charged into a hopper 10 provided with a vibrator 11 to control feeding of the material from the hopper onto a suitable support sheet 12. The support 12 is fed from a supply roll 13 over a guide roll 14, a flat support member 15, a support roll 16, and onto a suitably driven conveyor belt 17 carried by rolls 18 and 19. The minus 100 mesh foamable material, designated 20, is distributed in a uniform layer on the support sheet 12, and is advanced therewith into a suitably heated oven, which is designated generally at 21. An upper support sheet 22 is

[1] Vapor permeability, in perms, of a cellular material, is the number of grains of water transmitted through a body thereof, per square foot of surface area, per hour, per inch of mercury pressure.
[2] The "elastic limit" of a foam is, herein, and in the art, the maximum compressive force that foam will withstand and still return to its original thickness when the force is released, and is expressed in pounds per square foot.

also fed from a suitable supply roll 23, under a guide roll 24, and into the oven 21 in spaced, generally parallel relationship with the sheet 12. Within the oven 21, the foamable material 20 is heated to a temperature of about 360° F., which heating initiates reaction between the hexamethylenetetramine and the novolac and also causes evolution of gases by the dinitrosopentamethylene tetramine. The combined effect of the gases given off by the dinitrosopentamethylene tetramine and of nitrogen gases given off as an incident to the curing reaction between the hexamethylenetetramine and the novolac is to expand the composition into a cellular structure, as indicated at 25, and to force the support sheet 22 against a suitably driven conveyor belt 26, which is mounted between rolls 27 and 28. The speeds of the conveyor belts 17 and 26 are substantially identical, and are such that each particle of the novolac has a residence time within the oven 21 of about 30 minutes. The resulting product, designated 29, is composed of a cured, thermoset novolac, in a cellular structure, and with the support sheets 12 and 22 adhered to the lower and upper surfaces thereof, respectively. By varying the weight of the foamable material 20 applied, per square foot of the support sheet 12, products varying in apparent density of from ¼ to 10 pounds per cubic foot can be produced. Higher density foams can also be produced, but are desirable only for special application for example as moldings.

*Example 2*

The novolac produced as described in the first paragraph of Example 1 has also been used to produce a cured, cellular, phenolic body by a modified method. In this case, the foamable composition was produced in a jacketed mixing vessel by charging thereto 77 parts by weight of the lump novolac, introducing steam into the jacket of the vessel to fuse the novolac and bring it to a temperature of about 110° C., and then adding to the fused novolac 5 parts by weight of diisobutylene, 5 parts by weight of ammonium acetate, 2 parts by weight of the silane employed in Example 1, 4 parts by weight of dinitrosopentamethylene tetramine and 10 parts by weight of hexamethylenetetramine, and rapidly but thoroughly mixing the resulting charge with a motor driven, propeller-type agitator to effect uniformity. A part of the resulting viscous liquid foamable composition was knife coated onto sheets of kraft paper approximately 6" square, to a thickness of about ¾ gram per square inch, and the remainder thereof was poured into shallow pans and cooled rapidly. After the foamable novolac composition coating on the kraft paper sheets had cooled and solidified, two of the coated sheets had cooled and solidified, two of the coated sheets were attached together, with the novolac-coated sides adjacent one another, placed in the previously described mold, and, after the first platen had been placed over the open mold top, heated to bring the foamable novolac composition to a temperature of about 360° F., and to keep the novolac composition at approximately such temperature for about 30 minutes. The flat platen was then removed, and a cured, expanded, phenolic material, adhered to the kraft paper sheets was removed from the mold. This material was substantially identical with that previously described in Example 1, having an apparent density of about 2.8 pounds per cubic foot, a vapor permeability of from 1 to 3 perms, and compressive and thermal properties as set forth above for a material of the corresponding density.

Cured, expanded, cellular bodies have also been produced from a solidified mass of the foamable composition produced as described in this example, after comminution to a particle size of about 40 mesh or finer, U.S. Sieve Series, by generally the method previously described in Example 1. The resulting products have had essentially the same properties, as a function of apparent density, as set forth in the foregoing table. Such procedures constitute the best presently known mode for practicing the instant invention because more effective mixing is achieved than by the dry powder mixing technique described in Example 1, and because control over quantity of the foamable composition is easier than when knife-, roller-, or other-coating techniques are used to spread a fused, foamable, novolac composition on a suitable carrier.

A cured, cellular, phenolic body can also be produced by charging a fused, foamable, novolac composition into hoppers 30 and 31, shown in FIG. 2 of the attached drawings, and flowing the composition onto support sheets 32 and 33 fed, respectively, from supply rolls 34 and 35. The support sheet 32 is passed over rolls 36 and 37, and into an oven indicated generally at 38. The support sheet 33 is passed over or around rolls 39, 40 and 41, and into the oven 38 in spaced, generally parallel relationship with the sheet 32. The foamable composition flows onto the sheet 32 at a point where the sheet is passing over a stationary support 42, and is spread into a thin, uniform layer by a doctor blade 43. The foamable composition flows onto the support sheet 33 at a point where the sheet is supported by a stationary support 44, and is spread into a thin, uniform layer by a doctor blade 45. If desired, roller coaters can be used instead of the doctor blades 43 and 45. The thin layer of the foamable composition on the support sheets 32 and 33 is designated 46. In the oven 38, the foamable sheet 46 is heated to a temperature of about 350° F., sufficient to initiate reaction between the hexamethylenetetramine and the novolac, and also sufficient to cause the dinitrosopentamethylene tetramine therein to evolve nitrogenous gases. The gas evolution within the oven 38, as previously described in connection with FIG. 1, causes expansion of the foamable material 46, as designated generally at 47, so that the support sheets 32 and 33 are forced against conveyor belts 48 and 49, as also previously discussed in connection with FIG. 1. A cured, expanded, phenolic material, adhered to the support sheets 32 and 33 is produced. This material, which is designated 50, is substantially identical with that designated 29 in FIG. 1, and has properties which depend upon its apparent density, as set forth in the foregoing table.

The experimental procedures described above also have been carried out, with substantially similar results, using the commercially available silanes of L–520 Silicone (Union Carbide and Carbon Corporation) and SF–1034 Silicone (General Electric Corporation) in place of the silane employed in the preceding examples. Similar results are obtained when all or part of the silanes employed in the preceding examples are replaced by other aforedefined monoalkyl-tri(polyalkoxydialkylsiloxy)-silanes in amounts ranging from about 0.2 part to about 10 parts of silane for each 80 parts of the phenolic novolac resin. Such useful silanes include: monoethyl-tri(polyalkoxydimethylsiloxy)-silanes having an average molecular weight of from 5000 to 7400; monomethyl-tri(polyalkoxydimethylsiloxy)-silanes having an average molecular weight of from 5000 to 7400; monoethyl-tri(polyalkoxydiethylsiloxy)-silanes having a molecular weight of from 5000 to 7400; and monomethyl-tri(polyalkoxydiethylsiloxy)-silanes having an average molecular weight of from 5000 to 7400.

Similar results have also been achieved using various commercially available novolacs, either in a solvent-free system, or, when foaming into a mass of intermeshed vitreous or other fibers, when a suitable organic solvent or dispersing medium is also used.

It will be apparent that various changes and modifications can be made from the specific details discussed herein, and shown in the attached drawings, without departing from the spirit and scope of the appended claims.

What we claim is:

1. A thermosettable composition comprising about 80 parts of a novolac resin, a quantity of a curing agent which is reactive with the novolac resin, by connecting molecules thereof through methylene groups, and sufficient in amount to convert, at an elevated temperature, the novolac resin to a thermoset condition, and from about 0.2 part to about 10 parts of a monoalkyl-tri(polyalkoxydialkylsiloxy)-silane of the formula $RSiZ_3$, wherein R is an alkyl radical containing from 1 to 3 carbon atoms, each Z includes a polyalkoxydialkylsiloxy radical of the formula

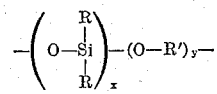

wherein R is an alkyl radical containing from 1 to 3 carbon atoms, R' is an alkylene radical containing from 1 to 4 carbon atoms, $x$ is a whole number of from 3 to 8, and $y$ is a whole number of from 8 to about 50, and the terminal —(O—R')— unit of each polyalkoxydialkylsiloxy radical is end stopped by an alkoxy radical containing from 1 to 5 carbon atoms.

2. A thermosettable composition comprising about 80 parts of a novolac resin, a quantity of a curing agent which is reactive with the novolac resin, by connecting molecules thereof through methylene groups, and sufficient in amount to convert, at an elevated temperature, the novolac resin to a thermoset condition, and from about 0.2 part to about 10 parts of a monoalkyl-tri-(polyalkoxydialkylsiloxy)-silane having an average molecular weight from about 2100 to 10,000 and a molecular structure which consists essentially of the groups

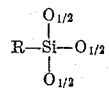

and

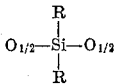

and

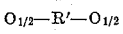

in molar proportions of from 1:12:60 to 1:24:100, wherein R is an alkyl radical containing from 1 to 3 carbon atoms and R' is an alkylene radical containing from 1 to 4 carbon atoms.

3. A foamable composition comprising about 80 parts of a novolac resin, a quantity of a curing agent which is reactive with the novolac resin, by connecting molecules thereof through methylene groups, and sufficient in amount to convert, at an elevated temperature, the novolac resin to a thermoset condition, ½ to 10 parts of a blowing agent which is comparatively stable at temperatures below the elevated temperature and which forms a gaseous decomposition product at the elevated temperature and from about 0.2 part to about 10 parts of a monoalkyl-tri(polyalkoxydialkylsiloxy)-silane of the formula $RSiZ_3$, wherein R is an alkyl radical containing from 1 to 3 carbon atoms, each Z includes a polyalkoxydialkylsiloxy radical of the formula

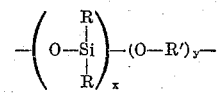

wherein R is an alkyl radical containing from 1 to 3 carbon atoms, R' is an alkylene radical containing from 1 to 4 carbon atoms, $x$ is a whole number of from 6 to 8, and $y$ is a whole number of from 20 to 40, and the terminal —O—R'— unit of each polyalkoxydialkylsiloxy radical is end stopped by an alkoxy radical containing from 1 to 5 carbon atoms.

4. A foamable composition comprising about 80 parts of a novolac resin, a quantity of a curing agent which is reactive with the novolac resin, by connecting molecules thereof through methylene groups, and sufficient in amount to convert, at an elevated temperature, the novolac resin to a thermoset condition, ½ to 10 parts of a blowing agent which is comparatively stable at temperatures below the elevated temperature and which forms a gaseous decomposition product at the elevated temperature and from about 0.2 part to about 10 parts of a monoalkyl-tri(polyalkoxydialkylsiloxy)-silane having an average molecular weight from about 5000 to 7400 and a molecular structure which consists essentially of the groups

and

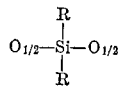

and

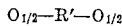

in molar proportions of from 1:12:60 to 1:24:100, wherein R is an alkyl radical containing from 1 to 3 carbon atoms and R' is an alkylene radical containing from 1 to 4 carbon atoms.

5. A foamable composition comprising about 80 parts of a novolac resin, from about 5 parts to about 20 parts of hexamethylenetetramine, ½ to 10 parts of a blowing agent which releases a gas within the range of 65° to 255° C. and from about 0.2 part of about 10 parts of a monoethyl-tri(polyalkoxydimethylsiloxy)-silane having an average molecular weight of from 5000 to 7400.

6. A foamable composition comprising about 80 parts of a novolac resin, from about 5 parts to about 20 parts of hexamethylenetetramine, ½ to 10 parts of a blowing agent which releases a gas within the range of 65° to 255° C. and from about 0.2 part to about 10 parts of a monomethyl-tri(polyalkoxydimethylsiloxy)-silane having an average molecular weight of from 5000 to 7400.

7. A foamable composition comprising about 80 parts of a novolac resin, from about 5 parts to about 20 parts of hexamethylenetetramine, ½ to 10 parts of a blowing agent which releases a gas within the range of 65° to 255° C. and from about 0.2 part to about 10 parts of a monoethyl-tri(polyalkoxydimethylsiloxy)-silane having an average molecular weight of from 5000 to 7400.

8. A foamable composition comprising about 80 parts of a novolac resin, from about 5 parts to about 20 parts of hexamethylenetetramine, ½ to 10 parts of a blowing agent which releases a gas within the range of 65° to 255° C. and from about 0.2 part to about 10 parts of a monomethyl-tri(polyalkoxydimethylsiloxy)-silane having an average molecular weight of from 5000 to 7400.

9. A foamable composition comprising about 80 parts of a novolac resin, from about 5 parts to about 20 parts of hexamethylenetetramine, from about 1 part to about 5 parts of dinitrosopentamethylenetetramine, and from about 0.2 part to about 10 parts of a monoethyl-tri(polyalkoxydimethylsiloxy)-silane having an average molecular weight of about 6200 and a formula of

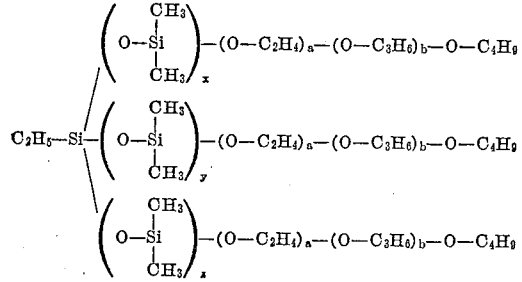

wherein $x$, $y$, and $z$ are whole numbers of about 7 with the sum of $x+y+z$ being about 20, and each $a$ and $b$ is a whole number of about 14 with the number of $C_2H_4$ radicals plus the number of $C_3H_6$ radicals plus the number of $C_4H_9$ radicals being about 90.

10. A foamable composition comprising about 80 parts of a novolac resin, from about 5 parts to about 20 parts of hexamethylenetetramine, ½ to 10 parts of a blowing agent which releases a gas within the range of 65° to 255° C. and from about 0.2 part to about 10 parts of a monoethyl-tri(polyalkoxydimethylsiloxy)-silane having an average molecular weight of about 6200 and a molecular structure which consists essentially of the groups

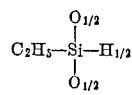

and

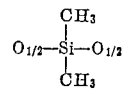

and

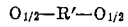

in molar proportions of about 1:20:80 and wherein R' is selected from the group consisting of ethylene and propylene radicals.

11. A thermoset, phenolic material produced by curing, at an elevated temperature, the composition claimed in claim 1.

12. A method for producing a thermosettable composition which includes the steps of: rapidly and thoroughly mixing with about 80 parts of a fused novolac resin, a quantity of a curing agent which is reactive with the novolac resin, by connecting molecules thereof through methylene groups, and sufficient in amount to convert, at an elevated temperature, the novolac resin to a thermoset condition, and from about 0.2 part to about 10 parts of a monoalkyl-tri(polyalkoxydialkylsiloxy)-silane of the formula $RSiZ_3$, wherein R is an alkyl radical containing from 1 to 3 carbon atoms, and each Z includes a polyalkoxydialkylsiloxy radical of the formula

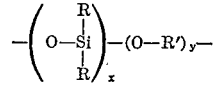

wherein R is an alkyl radical containing from 1 to 3 carbon atoms, R' is an alkylene radical containing from 1 to 4 carbon atoms, $x$ is a whole number of from 3 to 8, $y$ is a whole number of from 8 to about 50, and the terminal —O—R'— unit of each polyalkoxydialkylsiloxy radical is end stopped by an alkoxy radical containing from 1 to 5 carbon atoms; and cooling the admixture which is formed before reaction proceeds to an appreciable extent between the novolac resin and the curing agent.

13. An article comprising a sheet material and a thin layer of a stable foamable composition adhered to said sheet material, said foamable composition comprising about 80 parts of a novolac resin and a quantity of a curing agent which is reactive with the novolac resin, by connecting molecules thereof through methylene groups, and sufficient in amount to convert, at an elevated temperature, the novolac resin to a thermoset condition, ½ to 10 parts of a blowing agent which releases a gas within the range of 65° to 255° C., and from about 0.2 part to about 10 parts of a monoalkyltri(polyalkoxydialkylsiloxy)-silane of the formula $RSiZ_3$, wherein R is an alkyl radical containing from 1 to 3 carbon atoms, each Z includes a polyalkoxydialkylsiloxy radical of the formula

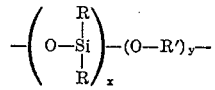

wherein R is an alkyl radical containing from 1 to 3 carbon atoms, R' is an alkylene radical containing from 1 to 4 carbon atoms, $x$ is a whole number of from 3 to 8, and $y$ is a whole number of from 8 to about 50, and the terminal —O—R′— unit of each polyalkoxydialkylsiloxy radical is end stopped by an alkoxy radical containing from 1 to 5 carbon atoms.

14. An article comprising a sheet material and a thin layer of a foamable composition adhered to said sheet material, said foamable composition comprising about 80 parts of a novolac resin, a quantity of a curing agent which is reactive with the novolac resin, by connecting molecules thereof through methylene groups, and sufficient in amount to convert, at an elevated temperature, the novolac resin to a thermoset condition, ½ to 10 parts of a blowing agent which releases a gas within the range of 65° to 255° C., and from about 0.2 part to about 10 parts of a monoalkyltri(polyalkoxydialkylsiloxy)-silane having an average molecular weight from about 2100 to 10,000 and a molecular structure which consists essentially of the groups

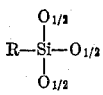

and

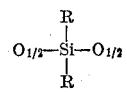

and

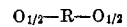

in molar proportions of from 1:12:60 to 1:24:100, wherein R is an alkyl radical containing from 1 to 3 carbon atoms and R′ is an alkylene radical containing from 1 to 4 carbon atoms.

15. The foamable composition of claim 3 in which the novolac resin is dissolved in an organic solvent.

16. The foamable composition of claim 9 in which the novolac resin is dissolved in an organic solvent.

References Cited in the file of this patent
UNITED STATES PATENTS

| | | |
|---|---|---|
| 2,834,748 | Bailey et al. | May 13, 1958 |
| 2,993,871 | Shannon et al. | July 25, 1961 |